United States Patent [19]

Moreno

[11] Patent Number: 5,349,607
[45] Date of Patent: Sep. 20, 1994

[54] RECEIVER FOR A DIGITAL RADIOMOBILE SYSTEM WITH CANCELLATION OF ISOFREQUENCY INTERFERING SIGNALS HAVING THE SAME KIND OF MODULATION, AND RELEVANT METHOD

[75] Inventor: Luigi Moreno, Turin, Italy

[73] Assignee: Italtel Societa Italiana Telecomunicazioni S.p.A., Milan, Italy

[21] Appl. No.: 859,475
[22] PCT Filed: Dec. 22, 1990
[86] PCT No.: PCT/EP90/02297
§ 371 Date: Aug. 14, 1992
§ 102(e) Date: Aug. 14, 1992
[87] PCT Pub. No.: WO91/10295
PCT Pub. Date: Jul. 11, 1991

[30] Foreign Application Priority Data
Dec. 22, 1989 [IT] Italy .................. 22841 A/89

[51] Int. Cl.$^5$ .................. H03D 1/00; H04L 27/06
[52] U.S. Cl. .................. 375/94; 375/99; 455/295
[58] Field of Search .................. 375/94, 96, 99, 14, 375/101, 102; 455/214, 295; 364/724.19, 724.2; 333/18

[56] References Cited
U.S. PATENT DOCUMENTS 5,124,551 8/1922 Borth et al. .................. 375/94 X
5,204,878 4/0793 Larsson .................. 375/94 X
5,251,233 10/1993 Labedz et al. .................. 374/94 X

OTHER PUBLICATIONS

"Demodulation of Cochannel QAM Signals" 1989 International Conference on Acoustics, Speech and Signal Processing vol. 2, May 1989 New York, R. Gooch, et al.
"Frequency-Selective Scintillation Effects and Decision Feedback Equalixation in High Data-Rate Satellite Links" Proceedings of The IEEE, vol 17, No. 6, Jun. 1983, New York, R. Bogusch.
D'Avella et al, "An Adaptive MLSE Receiver for TDMA Digital Mobile Radio," IEEE Journal on Sel. Areas in Comm. vol. 7, No. 1, Jan. 1989.

Primary Examiner—Stephen Chin
Assistant Examiner—Bryan Webster

[57] ABSTRACT

In one receiver for phase modulated digital signals, bit packet transmitted with known preamble, of the type foreseeing a maximum likelihood estimation circuit for distortion corrections, it is performed the cancellation of isofrequency interfering signals, having the same frequency of the useful signal and the same modulation type as well.

This is obtained making an estimation of amplitude (A), phase ($\Phi$) and time synchronism ($\tau$) parameters of the interfering signal in correspondence of each bit packet and reconstructing the useful signal with a maximum likelihood estimation process employing these parameters (FIG. 1).

26 Claims, 3 Drawing Sheets

RECEIVER FOR A DIGITAL RADIOMOBILE SYSTEM WITH CANCELLATION OF ISOFREQUENCY INTERFERING SIGNALS HAVING THE SAME KIND OF MODULATION, AND RELEVANT METHOD

The present invention refers to the transmission of digital type information and in particular to a radiomobile system with bit packet (burst mode) information transmission, in which a sub-packet of known bits (preamble) is transmitted to enable the receiver to make an estimation of distortion characteristics of the transmission channel for the best reception of the useful signal.

BACKGROUND OF THE INVENTION

In a cell-structured radiomobile system, in which the different available frequencies are used at the same time in different cells, there is the so-called problem of isofrequency (co-channel) interference, that is the simultaneous presence of a useful desired signal and of an undesired interfering signal having the same frequency of the useful signal, and the same type of modulation as well, with a level such as to considerably disturb the reception of the useful signal.

The technical problem at the basis of this invention is therefore to eliminate or at least to reduce within acceptable limits, the effect of an isofrequency interfering signal in a digital radio transmission system with signal phase modulation. In almost all the cases the kind of modulation of the interfering signal is known, being in practice a signal "within" the system, and that for another area of the system it is even a useful signal, and just for this reason it presents all the presuppositions to be added to the useful signal of the subject cell.

Different techniques are known aiming to reduce or eliminate an isofrequency interfering signal.

One of these techniques, particularly developed for military utilizations against jamming interferences, foresees the use of one or more auxiliary antenna for the reception of the sole interfering signal, or of the useful signal plus the interfering one, and processing of the different signals received to eliminate the interfering signal.

In some cases antenna arrays with gain and phase shift (fixed or adaptive) which determine a directivity "notch" in the direction from which the signal comes, are employed.

This technique requires the use of several suitably configured antennas and the knowledge of the direction the interfering signal comes from being therefore very complex.

Another known technique is applied to angular modulated signals (and therefore at constant envelope). This technique is based on the principle that the presence of an isofrequency interfering signal, added to the useful signal, changes the envelope of the whole signal. Envelope fluctuations enable elimination of the element due to the interfering signal on the demodulated one. This technique is particularly applied in radio links connection between fixed points. However, in radiomobile transmission systems, the almost constant presence of multiple echos at the receiver input results in fluctuations of the envelope of the signal received, making difficult the separation of the effect of the possible isofrequency interfering signal from that of echos on the useful signal.

Finally, Phase Locked Loop or PLL receivers are known and employed for the demodulation of frequency modulation analogue signals, with partial suppression of the isofrequency interfering signal, but which cannot be used nor adapted to digital information transmission systems.

An Interference Canceller is reported in the "1989 International Conference on Acoustics, Speech and Signal Processing, vol. 2, May 1989, New York, pages 1392-1395". The proposal refers to a continuous transmission system, where a loop adaptation of receiver parameters can be implemented, with acceptable transient times. Moreover, Maximum Likelihood Estimation is used not as the primary estimation process, but just in the context of an error correction process. Finally, the error detection procedure, based on the examination of a difference signal after signal reconstruction, works only under low BER (bit error rate) conditions, where the contribution of a single errored bit does not overlap with other errored bits.

Loop adaptation of receiver parameters is not considered in a TDMA, or in general in a burst mode transmission system since the burst length is in general too short to allow parameter setting.

SUMMARY OF THE INVENTION

An object of this invention is to cancel or to considerably reduce the effect of an isofrequency interfering signal having the same modulation of the useful signal consisting of a phase modulated digital signal which is transmitted in bit packets.

This object is attained with the invention comprising in a receiver for phase modulated digital signals in a burst mode transmission system, each burst including a known preamble of the type foreseeing a maximum likelihood estimation circuit for the correction of distortions:

a sampling and conversion circuit having a sampling frequency multiple of the bit transmission frequency, with analogue-to-digital conversion of samples;

an estimation circuit of the channel impulse response which input is connected to the output of said sampling circuit, and which output is connected to a control input of the maximum likelihood estimation circuit;

characterized by the fact to foresee combined:

an estimation circuit of interference parameters connected to the output of said sampling and conversion circuit and to the output of said estimation circuit of the channel impulse response, two outputs of said estimation circuit being connected to the same number control inputs of the maximum likelihood estimation circuit;

a sampling selection circuit connected to the output of said sampling circuit and controlled by a third output of said estimation circuit, the output of the selection circuit being connected to the input of the maximum likelihood estimation circuit.

The invention consists also in a method for the cancellation of an isofrequency interfering signal having the same modulation of the useful signal in a phase modulated burst mode transmission system, each burst including a known preamble, characterized by the fact:

a. to carry out an estimation of amplitude (A), phase ($\Phi$) and time synchronism ($\tau$) parameters of the interfering signal in correspondence of each bit packet;

b. to carry out a reconstruction of the useful signal (estimation of the digit sequence) with a maximum likelihood estimation process employing said parameters.

The invention proposes therefore a processing of the preamble which, besides the usual estimation of the channel impulse response (CIR), also enables estimation of the amplitude, the phase and the time synchronism of an isofrequency interfering signal and use of these parameters to cancel the interfering signal. The Maximum Likelihood Sequence Estimation (MLSE) is used for directly suppressing the influence of interfering components in the detection process, after and estimate of useful and interfering signal parameters has been performed by means of preamble processing. No tentative decisions are produced and no error detection/correction is performed.

The invention is particularly applied in a TDMA digital radiomobile system with MSK or GMSK modulation, with reference to which it shall be described later on, however this application should not be considered as a limitation to the scope of the invention.

BRIEF DESCRIPTION OF THE DRAWINGS

The enclosed figures show a preferred realization form of the invention.

DETAILED DESCRIPTION

Figure 1:
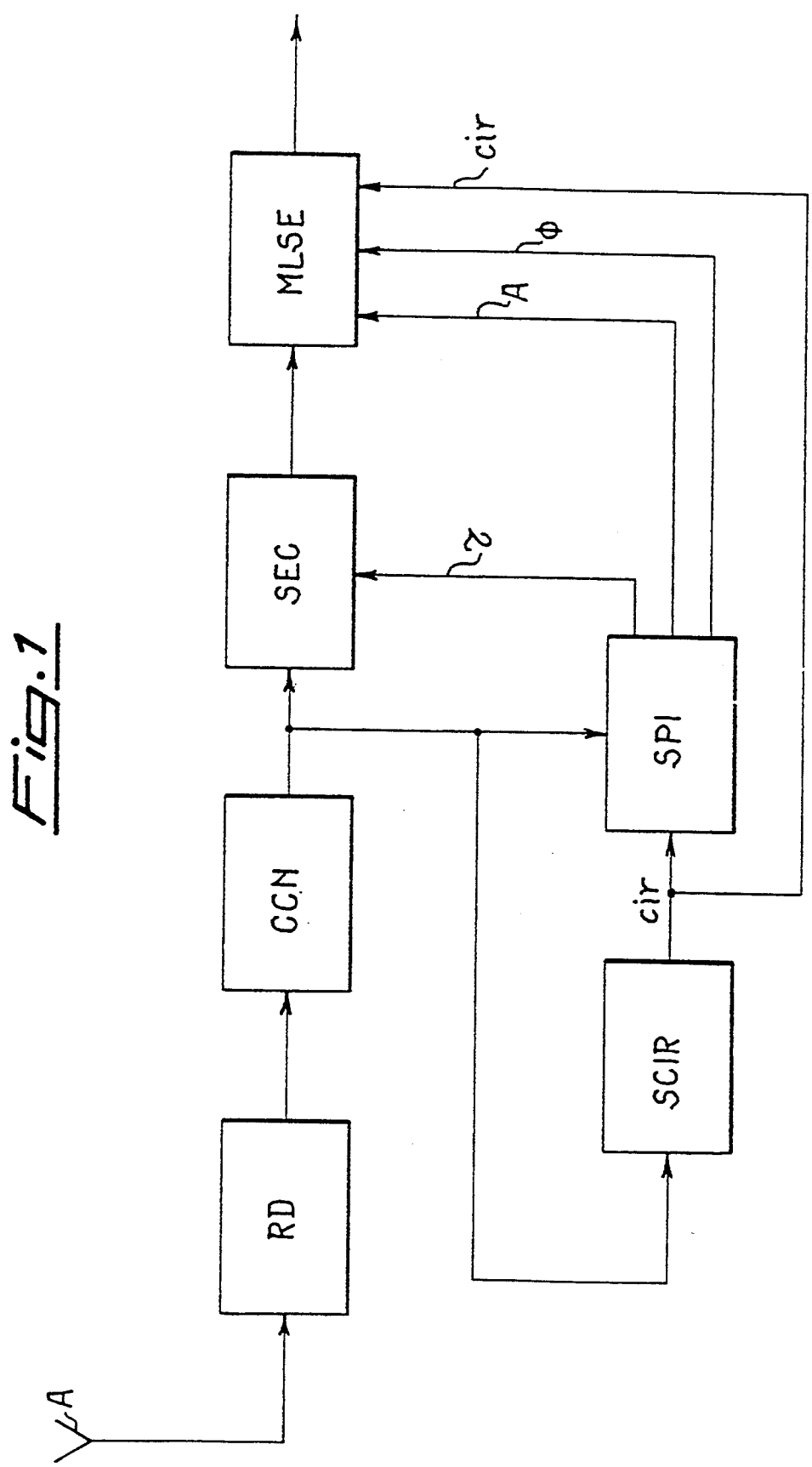
FIG. 1 shows a block diagram of the device according to the invention.

With reference to the block diagram in FIG. 1, the receiver according to the invention includes an RD block for the reception and demodulation of the signal coming from antenna A, at which output a baseband signal (low frequency) is available. Typically this signal is a digital signal with GMSK modulation and the receiver is a receiver for radiomobile system.

This signal is submitted to sampling with subsequent analogue-to-digital conversion of samples in the subsequent block CCN.

In known receivers, this sampling is carried out drawing a sample for each bit of the packet, and samples so obtained are converted to the digital form. Always according to the known technique, these digitalized samples are used for the estimation of the response to the impulse of the transmission channel (Channel Impulse Response or CIR) and applied at the same time to a Viterbi processor which reconstructs the useful signal applying a maximum likelihood criterion on the ground of parameters supplied by CIR.

For the estimation of the channel conditions the so-called preamble is used, formed by a known bit sequence transmitted in a preset position in the packet.

On the contrary, according to the invention, the CCN block performs n samplings per bit, that is it performs the sampling and the relevant digital coding of n samples for each bit. According to the preferred realization form, n=4 and samplings are made at equal intervals.

Digitalized samples so obtained are used for an estimation of CIR in block SCIR, thus obtaining the cir signal which is brought in the SPI block receiving also the digitalized samples. The SPI block produces an estimation of parameters of the interfering signal, in particular an estimation of amplitude A, an estimation of phase $\Phi$ and an estimation $\tau$ of synchronism or time reference of the interfering signal.

The estimation of the time synchronism $\tau$ is used in the selection of one of the four samples in such a way that the interfering signal could be cancelled more easily in the Viterbi processor present in the MLSE maximum likelihood estimation block. This selection takes place in the SEC block which is connected to the output of CCN sampler and controlled by the signal $\tau$ coming from SPI.

Phase $\Phi$ and amplitude A estimations are brought to the MLSE block together with the cir signal and with one sample out of four selected through the signal $\tau$.

Figure 2:
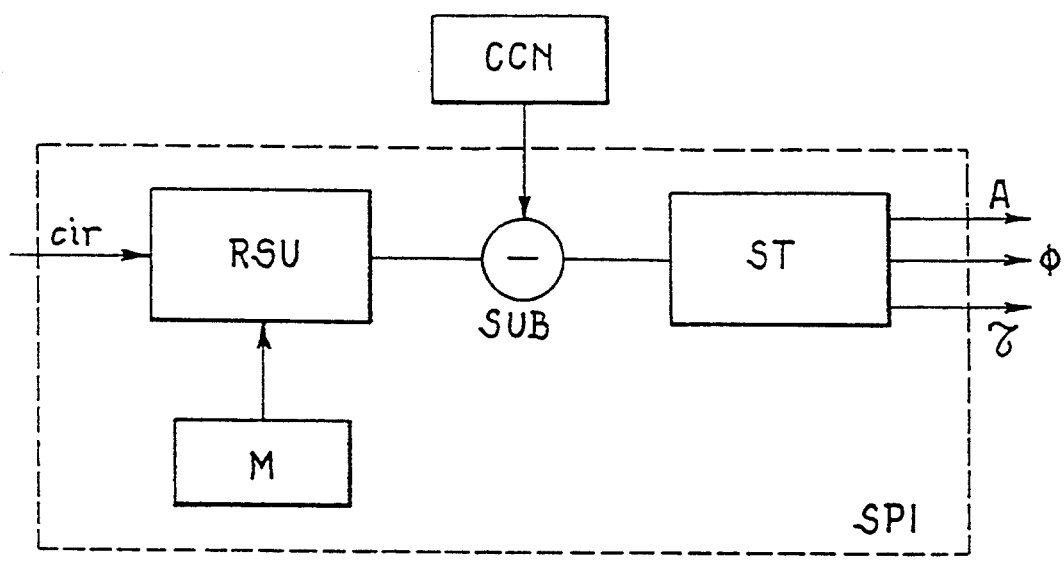
FIG. 2 shows a block diagram of the device for parameter estimation of the interfering signal.

The estimation of the interfering signal is obtained using the content of the preamble actually received, in circuit SPI the structure of which is shown in FIG. 2 more in detail.

The signal cir is used for the reconstruction of the useful signal in a RSU block where the cir and the preamble content (stored in a memory M) are brought. The RSU block can be implemented with a traversal filter performing the convolution between the preamble binary sequence (known) and the channel response (cir).

In the subtractor SUB, the reconstruction of the useful signal performed by RSU is substracted from the signal coming from CNN and including both the useful signal and the interfering one: from the signal so obtained an estimation of the signal interfering in block ST is obtained. More in detail, the phase $\Phi$, the time synchronism $\tau$ and the amplitude A are evaluated with known procedures, suitable to the modulation used and not shown in detail. As an indication, a calculation of the effective value (root square value) on the sequence of samples coming out from the subtractor block can be used for A, while for $\Phi$ and $\tau$ the estimation depends on the type of modulation: e.g. for GMSK and MSK modulations the known deBuda procedure can be applied.

The reconstruction of the useful signal is carried out using this information through direct application of the Viterbi algorithm, or preceeded by Whitening Filter, according to Forney, or preceeded by Matched Filter, according to Ungerboeck or according to other estimation methods based on the maximum likelihood criteria.

Figure 3:
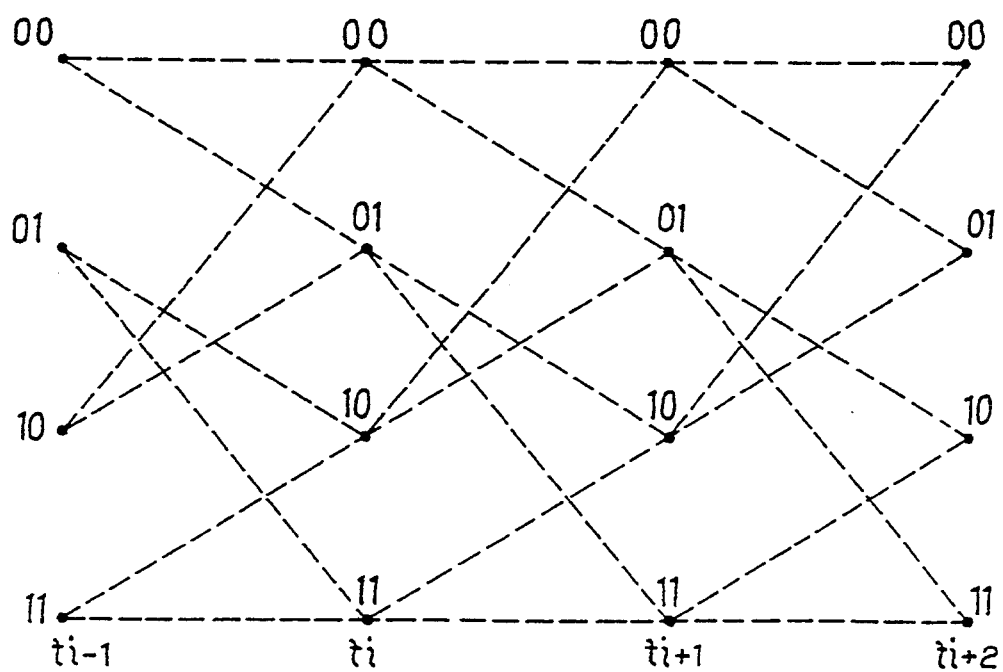
FIGS. 3 to 5 show the signal reconstruction.

As known, a maximum likelihood estimation procedure can be diagrammed with a trellis diagram, shown in FIG. 3 in a highly simplified form, only for illustration purposed.

The four possible codes received on a given instant (or states of the receiver) are shown as four vertically aligned points. In the simplifying hypothesis that channel distortions will determine an intersymbol interference between two adjacent bits, that is with channel memory equal to two bits, each state is identified by the pair of the last two bits received.

Transitions of the states relevant to the instant $t_i$ to those relevant to the instant $t_{i+1}$ are bound by the fact that the last bit concerning the instant $t_i$ coincide with the last but one in $t_{i+1}$. For instance, in FIG. 3 transitions allowed by the state "01" are only those leading to "11" and "10".

Each "path" on the trellis (state succession) represents an hypothetical sequence of bits received. Among the various paths leading to a state, the one corresponding to the bit sequence which maximizes the "likelihood function" calculated with the known methods of the statistic theory of communications is selected.

Figure 4:
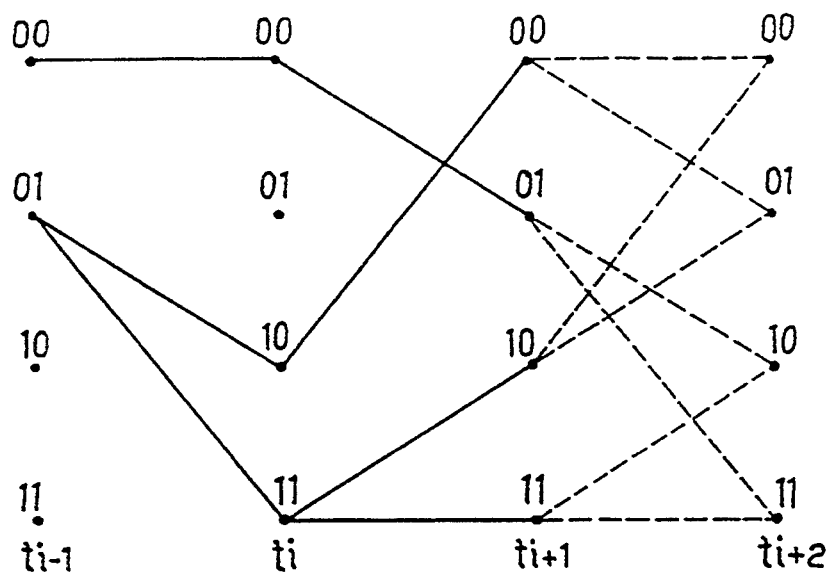

In the example of FIG. 4 the paths leading to each one of the four states of the instant $t_{i+1}$ with the maximum likelihood are shown. In the following step it can be noticed how it is possible to reach each one of the four states of the instant $t_{i+2}$ selecting two different transitions, e.g. 01-10-00-01 and 01-11-10-01. The one corresponding to the maximization of the likelihood function shall be chosen. In this way some of the paths which arrived at instant $t_{i+1}$ are interrupted, while other survivors go on. In FIG. 4 survivors are marked with a continuous line, while allowed prosecutions are indicated with a dotted line. At the end of the sequence of bits received, the path on the trellis could be optimized, that is the bit sequence, to which the maximum likelihood is associated. In a very diagrammatic form this is what is commonly performed in the known technique.

According to the invention, in case an interfering signal is present, whose amplitude A and reference phase Φ has been estimated, the above described procedure is modified considering that the signal received is no more a s(t) signal, that is a possibly distorted useful signal, but it is given by S(t)+i(t), that is useful signal+an interfering signal. For instance, in the case of interfering signal with binary phase digital modulation, we shall have:

$$i(t) = A \exp \{j[2\pi fo\ t + \Phi + \alpha(t)]\}$$

where:

fo is the carrier frequency known and coinciding with the useful signal one (isofrequency interference); $\alpha(t) = \pm \pi/2$ is the phase element carrying the modulating binary information, constant for one bit duration.

Figure 5:
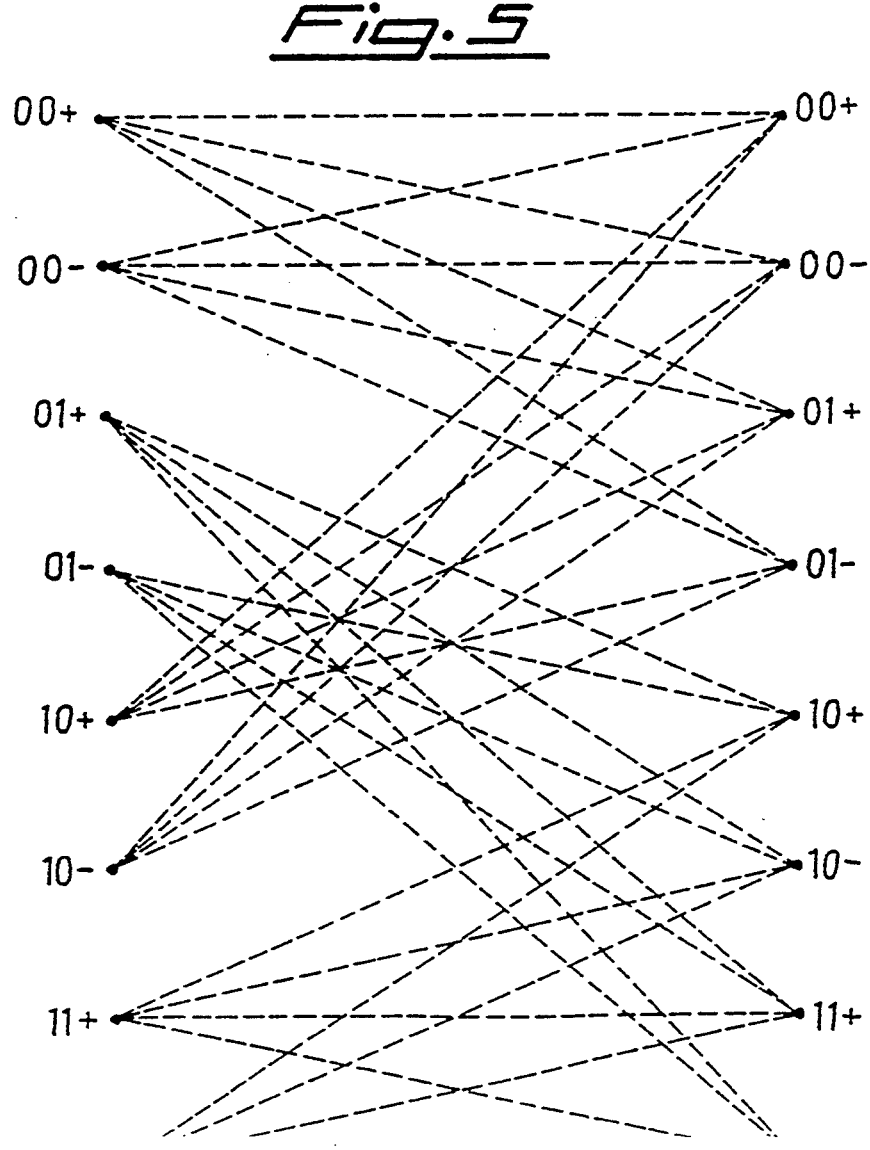

The trellis diagram modifies in the example shown, as it can be seen in FIG. 5. The number of states doubles from four to eight since at each bit period we can have two different hypothesis on the phase of the interfering signal, that is $\alpha = +\pi/2$, or $\alpha = -\pi/2$. In a real case the number of states results being at least doubled.

Depending on the hypothesis on the α value the likelihood function modifies (depending also on the amplitude A of the interfering signal, already estimated) and the different values of the function itself are calculated per each one of the eight states. The procedure is then continued according to the known technique, updating step by step the likelihood measure and selecting the survivors on this basis.

I claim:

1. A receiver for phase modulated digital signals in a burst mode transmission system, each burst including a known preamble for the correction of distortions, the receiver including:
    a sampling circuit sampling a received signal at a sampling rate equal to a multiple of the bit transmission frequency;
    an estimation circuit estimating the channel impulse response having as an input samples from said sampling circuit and having an output connected to a control input of a maximum likelihood estimation circuit;
    an interference estimation circuit estimating interference parameters including amplitude, phase and synchronism, having inputs of the samples from said sampling circuit and the channel impulse response from said estimation circuit, and outputting amplitude and phase parameter signals to the maximum likelihood estimation circuit;
    a sampling selection circuit selecting a sample from said sampling circuit and having a control input of a signal representing the synchronism parameter output from said estimation circuit and having an output of the selected sample to an input of the maximum likelihood estimation circuit.

2. The receiver according to claim 1, wherein said estimation circuit includes:
    a convolution block outputting a reconstructed signal connected to the estimation circuit and to a memory in which said preamble is contained;
    a subtractor connected to an output of the convolution block and an output of the sampling circuit; and
    an estimation block connected to an output of the subtractor to obtain estimations of the phase, the amplitude and the synchronism parameter.

3. A method for the cancellation of an isofrequency interfering signal having the same modulation of a transmitted signal in a phase modulated burst mode transmission system, each burst including a known preamble, both the isofrequency interfering signal and the transmitted signal being received in a received signal the method comprising:
    demodulating the received signal;
    sampling the demodulated received signal at a frequency multiple of the bit transmission frequency, producing samples; estimating amplitude, phase and synchronism parameters of the interfering signal;
    reconstructing the transmitted signal with a maximum likelihood estimation process employing said parameters.

4. The method according to claim 3, further comprising selecting one of said samples for the maximum likelihood estimation process in response to the estimated time synchronism parameter of the interfering signal.

5. The method according to claim 3, wherein said sampling takes place at a frequency equal to four times the bit frequency.

6. A method for the cancellation of an isofrequency interfering signal having the same modulation of a transmitted signal in a phase modulated burst mode transmission system, each burst including a known preamble, both the isofrequency interfering signal and the transmitted signal being received in a received signal the method comprising:
    demodulating the received signal;
    sampling the demodulated received signal at a frequency multiple of the bit transmission frequency, producing samples;
    estimating amplitude, phase and synchronism parameters of the interfering signal;
    reconstructing the transmitted signal with a maximum likelihood estimation process employing said parameters;
    wherein said parameters are estimated as a function of the comparison between the received signal and a preliminary reconstruction of the transmitted signal.

7. A method for the cancellation of an isofrequency interfering signal having the same modulation of a transmitted signal in a phase modulated burst mode transmission system, each burst including a known preamble, both the isofrequency interfering signal and the transmitted signal being received in a received signal the method comprising:
    demodulating the received signal;
    sampling the demodulated received signal at a frequency multiple of the bit transmission frequency, producing samples;

estimating amplitude, phase and synchronism parameters of the interfering signal;

reconstructing the transmitted signal with a maximum likelihood estimation process employing said parameters; wherein the reconstruction of the transmitted signal is responsive to a channel response estimation of the received preamble.

8. The method according to claim 4, wherein the maximum likelihood estimation process is performed with a Viterbi algorithm.

9. The method according to claim 6, wherein the maximum likelihood estimation process is carried out with a Viterbi algorithm preceded by a whitening filter.

10. The method according to claim 7, wherein the maximum likelihood estimation process is carried out with a Viterbi algorithm preceded by matched filter.

11. An apparatus for the cancellation of an isofrequency interfering signal having the same modulation of a transmitted signal in a phase modulated burst mode transmission system, each burst including a known preamble, both the isofrequency interfering signal and the transmitted signal being received in a received signal, the apparatus comprising:

a demodulator for demodulating the received signal;

sampler for sampling the demodulated received signal at a frequency multiple of the bit transmission frequency, producing samples;

means for estimating amplitude, phase and synchronism parameters of the interfering signal;

means for reconstructing the transmitted signal with a maximum likelihood estimation process employing said parameters.

12. The apparatus according to claim 11, further comprising means for selecting one of said samples for the maximum likelihood estimation process in response to the estimated time synchronism parameter of the interfering signal.

13. The apparatus according to claim 11, wherein said sampler samples at a frequency equal to four times the bit frequency.

14. The apparatus according to claim 11, wherein said means for estimating estimates said parameters as a function of the comparison between the received signal and a preliminary reconstruction of the transmitted signal.

15. The apparatus according to claim 11, wherein the reconstructing means is responsive to a channel response estimation of the received preamble.

16. The apparatus according to claim 11, wherein the reconstructing means includes a Viterbi processor.

17. The apparatus according to claim 12, wherein the reconstructing means includes a Viterbi processor preceded by a whitening filter.

18. The apparatus according to claim 13, wherein the reconstructing means includes a Viterbi processor preceded by matched filter.

19. A filter, for removing an undesired signal from a received signal, to approximate a transmitted signal, comprising:

a demodulator, demodulating the received signal;

a sampler, sampling the demodulated signal;

a first estimator, estimating a channel impulse response, having an input of the sampled demodulated signal, and outputting a channel impulse response;

a second estimator, estimating an amplitude and a phase of the undersired signal on the basis of the channel impulse response and the sampled demodulated signal;

an approximation circuit, approximating the transmitted signal as a function of the sampled demodulated signal, the amplitude of the undesired signal and the phase of the undesired signal.

20. The filter of claim 19, wherein said approximation circuit includes means for applying a Viterbi algorithm.

21. The filter of claim 20, wherein said approximation circuit includes a whitening filter.

22. The filter of claim 20, wherein said approximation circuit includes a matched filter.

23. The filter of claim 19, wherein the received signal includes a modulated digital bit stream signal and said sampler samples multiple samples for each bit period; and said first estimator estimates synchronism of the undesired signal as a function of the channel impulse and the multiple samples; and the filter further comprises a sample selector, selecting one of the multiple samples for each bit period as a function of the synchronism, and outputting the selected sample to the approximation circuit.

24. A method for removing an undesired signal from a received signal, to approximate a transmitted signal, comprising the steps of:

(a) demodulating the received signal;

(b) sampling the demodulated signal;

(c) estimating a channel impulse response as a function of the sampled demodulated signal;

(d) estimating an amplitude and a phase of the undesired signal on the basis of the channel impulse response and the sampled demodulated signal;

(e) approximating the transmitted signal as a function of the sampled demodulated signal, the amplitude of the undesired signal and the phase of the undesired signal.

25. The method of claim 24, wherein the received signal includes a modulated digital bit stream signal and said step (b) of sampling samples multiple samples for each bit period; and further comprising the steps (f) estimating synchronism of the undesired signal as a function of the channel impulse and the multiple samples; and (g) selecting one of the multiple samples for each bit period as a function of the synchronism for approximating in step (e).

26. The method of claim 24, wherein step (e) includes approximating the transmitted signal utilizing maximum likelihood sequence estimation.

* * * * *